(12) United States Patent
Kawanishi et al.

(10) Patent No.: US 9,079,721 B2
(45) Date of Patent: Jul. 14, 2015

(54) COMBINATION WEIGHER

(75) Inventors: Shozo Kawanishi, Hyogo (JP);
Takeyoshi Nagao, Hyogo (JP); Takaaki Kawashima, Hyogo (JP)

(73) Assignee: YAMATO SCALE CO., LTD., Akashi (JP)

( * ) Notice: Subject to any disclaimer, the term of this patent is extended or adjusted under 35 U.S.C. 154(b) by 113 days.

(21) Appl. No.: 14/007,950

(22) PCT Filed: Jun. 2, 2011

(86) PCT No.: PCT/JP2011/003119
§ 371 (c)(1),
(2), (4) Date: Dec. 9, 2013

(87) PCT Pub. No.: WO2012/131789
PCT Pub. Date: Oct. 4, 2012

(65) Prior Publication Data
US 2014/0083816 A1  Mar. 27, 2014

(30) Foreign Application Priority Data
Mar. 28, 2011  (JP) .................................. 2011-070159

(51) Int. Cl.
*B65G 43/00* (2006.01)
*G01G 19/393* (2006.01)
(Continued)

(52) U.S. Cl.
CPC ................ *B65G 43/08* (2013.01); *G01G 11/14* (2013.01); *G01G 13/16* (2013.01); *G01G 19/393* (2013.01)

(58) Field of Classification Search
CPC ..... B65G 1/32; G01G 19/387; G01G 19/393; G01G 13/026; G01G 13/08
USPC ............................ 198/502.2; 177/1, 25.18, 59
See application file for complete search history.

(56) References Cited

U.S. PATENT DOCUMENTS 4,442,910 A    4/1984  Mikami
4,487,277 A *  12/1984 Morita et al. .............. 177/25.18
(Continued)

FOREIGN PATENT DOCUMENTS

CN    101421596 A    4/2009
FR    2 725 704 A1    4/1996
(Continued)

OTHER PUBLICATIONS

Office Action for Canadian Patent Application No. 8,828,850, dated Jan. 27, 2015.
(Continued)

*Primary Examiner* — James R Bidwell
(74) *Attorney, Agent, or Firm* — Marshall, Gerstein & Borun LLP

(57) ABSTRACT

A combination weigher comprises a collecting conveyor which conveys objects and discharges the objects; a plurality of weighing conveyors configured to convey the objects fed thereto and discharge the objects, to feed the objects to the collecting conveyor apparatus; a plurality of weight sensors for measuring weights of the objects held on the weighing conveyors; and a control section which finds a discharge combination including a combination of the weighing conveyors holding the objects in which a total weight thereof falls within a target weight range, based on the measured weight values of the weight sensors and activates the weighing conveyors selected to make up the discharge combination to convey the objects on the weighing conveyors and discharge the objects, wherein a conveying speed of the collecting conveyor apparatus is set higher than a conveying speed of the weighing conveyors.

13 Claims, 6 Drawing Sheets

(51) Int. Cl.
    *B65G 43/08*     (2006.01)
    *G01G 13/16*     (2006.01)
    *G01G 11/14*     (2006.01)

(56) References Cited

U.S. PATENT DOCUMENTS

| | | | |
|---|---|---|---|
| 4,658,920 A * | 4/1987 | Matsumoto et al. | 177/25.18 |
| 4,846,291 A * | 7/1989 | Osawa et al. | 177/25.18 |
| 4,889,224 A | 12/1989 | Denker | |
| 4,995,467 A * | 2/1991 | Niemann | 177/25.18 |
| 5,267,638 A | 12/1993 | Doane | |
| 5,596,179 A | 1/1997 | Sakaeda | |
| 5,753,866 A * | 5/1998 | Ikeda et al. | 198/502.2 |
| 5,998,740 A * | 12/1999 | Kvisgaard et al. | 177/25.18 |
| 6,018,128 A * | 1/2000 | Asai | 177/4 |
| 7,279,645 B1 * | 10/2007 | Inglin et al. | 177/145 |
| 8,119,934 B2 * | 2/2012 | Kawanishi | 177/25.18 |
| 2008/0011583 A1 | 1/2008 | Beck et al. | |
| 2010/0012394 A1 | 1/2010 | Kawanishi | |

FOREIGN PATENT DOCUMENTS

| | | |
|---|---|---|
| JP | 53-006196 | 1/1978 |
| JP | 59-95230 | 6/1984 |
| JP | 3-114022 U | 11/1991 |
| JP | 4-36428 | 3/1992 |
| JP | 05-178327 | 7/1993 |
| JP | 07-019941 | 1/1995 |
| JP | 07-033139 | 7/1995 |
| JP | 3017413 U | 10/1995 |
| JP | 2002-053106 A | 2/2002 |
| JP | 2004-338880 A | 12/2004 |
| JP | 2005-315579 A | 11/2005 |
| JP | 2006-194722 A | 7/2006 |
| JP | 2006-214784 A | 8/2006 |
| JP | 2011-022017 A | 2/2011 |
| WO | WO-93/23724 A1 | 11/1993 |

OTHER PUBLICATIONS

Office Action for Japanese Patent Application No. 2011-070159, dated Feb. 10, 2015.
Search Report for CN Patent Application No. 2011800661367, dated Mar. 14, 2014.
Extended European Search Report for EP 11862397.4, dated Aug. 29, 2014.
International Search Report for PCT/JP2011/003119, dated Jun. 28, 2011.
English-Language Search Report and Office Action for CN Patent Application No. 2011800661367, dated Sep. 23, 2014.

* cited by examiner

COMBINATION WEIGHER

TECHNICAL FIELD

The present invention relates to a combination weigher which finds a combination in which a total weight of objects falls within a predetermined target weight range.

BACKGROUND ART

Combination weighers are roughly classified into an automatic combination weigher, a semiautomatic combination weigher and a hand-operated (manual) combination weigher, depending on a difference in a feeding method and a discharge method of objects with respect to a weighing unit. In the hand-operated combination weigher, feeding and discharging of the objects are performed manually by an operator. In the semiautomatic combination weigher, feeding of the objects is performed manually by the operator, while discharging of the objects is performed automatically (see e.g., Patent Literature 1). In the automatic combination weigher, feeding and discharging of the objects are performed automatically (mechanic control) (see e.g., Patent Literature 2). For the objects which are incapable of being fed automatically to a combination weigher or the objects which are not suitable for use in the automatic feeding, the hand-operated combination weigher or the semiautomatic combination weigher is used. Also, in some cases, an alignment device is provided in a subsequent stage of the combination weigher to align the objects discharged from the combination weigher (see e.g., Patent Literature 3).

In a conventional semi-automatic combination weigher, for example, a plurality of hoppers are arranged linearly, and a single belt conveyor is placed under the plurality of hoppers. When an operator feeds the objects to the hoppers, the objects are weighed, discharge gates of the hoppers selected to make up a combination in which a combination weight falls within a predetermined weight range are opened and closed to discharge the objects, the objects discharged from the hoppers are conveyed in one direction by a belt conveyor, and the objects are discharged to a subsequent-stage apparatus, such as a packaging machine.

CITATION LIST

Patent Literature

Patent Literature 1: Japanese Laid-Open Patent Application Publication No. 2006-214784
Patent Literature 2: Japanese Examined Utility Model Application Publication No. Hei. 7-33139
Patent Literature 3: Japanese Laid-Open Patent Application Publication No. 2002-53106

SUMMARY OF INVENTION

Technical Problem

In the above stated conventional combination weigher, after the objects are dropped from a plurality of hoppers selected to make up the discharge combination onto the belt conveyor, they are conveyed by the belt conveyor and discharged therefrom. Therefore, for example, in a case where the objects of a bar shape or an elongated shape are discharged, their directions cannot not be made to conform to each other.

Also, in the above stated conventional combination weigher, the objects are discharged from the hoppers selected to make up the combination onto the belt conveyor, and conveyed thereon. Since the belt conveyor conveys the objects in a direction in which the hoppers are aligned, the hoppers are placed at a location which is much higher than a location of the belt conveyor, to prevent the objects being conveyed from contacting the hoppers. Because of this, a great impact is generated when the objects are dropped from the hoppers onto the belt conveyor. For this reason, the objects which are easily broken or damaged are more likely to be damaged, so that their commercial value will degrade or the damaged objects will be unsalable products.

The present invention has been made to solve the above described problems, and an object of the present invention is to provide a combination weigher which is capable of discharging objects which are easily broken or damaged, due to an impact or the like generated when they are dropped, without causing damages to the objects, and in a state in which their lengthwise directions conform to each other.

Solution to Problem

To achieve the above described object, according to an aspect of the present invention, a combination weigher comprises a collecting conveyor apparatus which conveys in a direction objects fed to the collecting conveyor apparatus and discharges the objects; a plurality of weighing conveyors arranged along a conveying direction of the collecting conveyor apparatus, the weighing conveyors being fed with the objects in a deactivated state in which the weighing conveyors do not convey the objects and being configured to convey the objects held thereon in a first direction and discharge the objects from one ends thereof, to feed the objects to the collecting conveyor apparatus in an activated state in which the collecting conveyor apparatus conveys the objects; a plurality of weight sensors provided to correspond to the weighing conveyors, respectively, to measure weights of the objects held on the weighing conveyors; a combination unit for finding a discharge combination including a combination of the weighing conveyors holding the objects in which a total weight thereof falls within a target weight range, based on the measured weight values of the weight sensors; and a weighing conveyor control unit which activates the weighing conveyors selected to make up the discharge combination to convey the objects on the weighing conveyors in the first direction and discharge the objects from one ends of the weighing conveyors; wherein a conveying speed of the collecting conveyor apparatus is set higher than a conveying speed of the weighing conveyors.

In accordance with this configuration, in the case of the objects having a bar shape or an elongate shape, by feeding the objects to the weighing conveyors such that lengthwise directions of the objects conform to the conveying direction of the weighing conveyors (including a case where the lengthwise directions of the objects substantially conform to the conveying direction of the weighing conveyors), the following situation occurs. When a head portion of the object discharged from the weighing conveyor contacts a conveying surface of the collecting conveyor apparatus, a rear portion of the object which is other than the head portion stays on the weighing conveyor, and then the object is discharged from the weighing conveyor while the head portion thereof is being moved by the collecting conveyor apparatus in the conveying direction of the collecting conveyor apparatus. By setting the conveying speed of the collecting conveyor apparatus higher than the conveying speed of the weighing conveyor, the lengthwise direction of the object can be smoothly changed into the direction conforming to the conveying direction of the collecting conveyor apparatus. As a result, the objects can be discharged from the collecting conveyor apparatus in a state in which the lengthwise directions of the objects discharged from the respective weighing conveyors conform to the conveying direction of the collecting conveyor apparatus.

The collecting conveyor apparatus may include two belt conveyors which have endless flat belts and are arranged in parallel with each other to have conveying surfaces of a V-shaped cross-section.

In accordance with this configuration, the objects lie down in the bottom portion of the V-shaped cross-section in the two belt conveyors on the collecting conveyor apparatus. Therefore, it becomes possible to surely attain a state in which the lengthwise directions of the objects discharged from the respective weighing conveyors conform to the conveying direction of the collecting conveyor apparatus and prevent the objects from rolling in a width direction (direction perpendicular to the conveying direction) of the collecting conveyor apparatus.

According to another aspect of the present invention, a combination weigher comprises a collecting conveyor apparatus including two belt conveyors which have endless flat belts and are arranged in parallel with each other to have conveying surfaces of a V-shaped cross-section, the collecting conveyor apparatus being configured to convey in a direction the objects fed to the collecting conveyor apparatus and discharge the objects; a plurality of weighing conveyors arranged along a conveying direction of the collecting conveyor apparatus, the weighing conveyors being fed with the objects in a deactivated state in which the weighing conveyors do not convey the objects and being configured to convey the objects held thereon in a first direction and discharge the objects from conveying ends thereof, to feed the objects to the collecting conveyor apparatus in an activated state in which the collecting conveyor apparatus conveys the objects; a plurality of weight sensors provided to correspond to the weighing conveyors, respectively, to measure weights of the objects held on the weighing conveyors; a combination unit for finding a discharge combination including a combination of the weighing conveyors holding the objects in which a total weight thereof falls within a target weight range, based on the measured weight values of the weight sensors; and a weighing conveyor control unit which activates the weighing conveyors selected to make up the discharge combination to convey the objects on the weighing conveyors in the first direction and discharge the objects from one ends of the weighing conveyors.

In accordance with this configuration, in the case of the objects having a bar shape or an elongate shape, by feeding the objects to the weighing conveyors such that lengthwise directions of the objects conform to the conveying direction of the weighing conveyors (including a case where the lengthwise directions of the objects subsequently conform to the conveying direction of the weighing conveyors), the following situation occurs. When a head portion of the object discharged from the weighing conveyor contacts a conveying surface of the collecting conveyor apparatus, a rear portion of the object which is other than the head portion stays on the weighing conveyor, and then the object is discharged from the weighing conveyor while the head portion thereof is being moved by the collecting conveyor apparatus in the conveying direction of the collecting conveyor apparatus. Then, on the collecting conveyor apparatus, the object lies down in the bottom portion of the V-shaped cross-section in the two belt conveyors. Therefore, it becomes possible to easily attain a situation in which the lengthwise direction of the object conforms to the conveying direction of the collecting conveyor apparatus. As a result, the objects can be discharged from the collecting conveyor apparatus in a state in which the lengthwise directions of the objects discharged from the respective weighing conveyors conform to the conveying direction of the collecting conveyor apparatus. Moreover, it becomes possible to prevent the objects from rolling in a width direction (direction perpendicular to the conveying direction) of the collecting conveyor apparatus.

The two belt conveyors may be placed with a gap between the belt conveyors; and the gap may be set to a dimension that prevents the objects held on the two belt conveyors from being dropped through the gap and prevents the objects from getting stuck in the gap.

In accordance with this configuration, if trash or the like adhering to the objects is dropped, it can be dropped through the gap between the two belt conveyors.

The combination weigher may further comprise: a weighing unit for measuring a weight of the objects conveyed by the collecting conveyor apparatus; and a weight abnormality determination unit for determining whether or not the weight of the objects which is measured by the weighing unit falls within the target weight range, when the objects are discharged from all of the weighing conveyors selected to make up the discharge combination to the collecting conveyor apparatus, the weight abnormality determination unit being configured to output a weight abnormality signal to an apparatus in a subsequent stage of the combination weigher, when the weight abnormality determination unit determines that the weight does not fall within the target weight range.

In accordance with this configuration, for example, if the trash or the like adhering to the objects is dropped through the gap between the two belt conveyors of the collecting conveyor apparatus, and as a result, the weight of the objects does not fall within the target weight range, the weight abnormality signal is output to the subsequent-stage apparatus. Therefore, by configuring the subsequent-stage apparatus so that it excludes the discharged objects in response to the weight abnormality signal, it becomes possible to prevent a situation in which the objects having an inappropriate weight which does not fall within the target weight range are shipped as a product.

The plurality of weighing conveyors may constitute first and second weighing conveyor groups which are placed such that the collecting conveyor apparatus is interposed between the first and second weighing conveyor groups; wherein the weighing conveyors in each of the first and second weighing conveyor groups may be arranged in parallel with each other; and wherein the weighing conveyors in each of the first and second weighing conveyor groups may be placed such that the collecting conveyor apparatus is placed at the one end side of the weighing conveyors and a conveying direction of the weighing conveyors is perpendicular to the conveying direction of the collecting conveyor apparatus.

In accordance with this configuration, since the weighing conveyor groups are placed at both sides of the collecting conveyor apparatus, the length of the collecting conveyor apparatus can be reduced, the discharge time of the objects can be reduced, and the combination weigher can be made compact.

The plurality of weighing conveyors may constitute first and second weighing conveyor groups which are placed such that the collecting conveyor apparatus is interposed between the first and second weighing conveyor groups; wherein the weighing conveyors in each of the first and second weighing conveyor groups may be arranged in parallel with each other;

and wherein the weighing conveyors in each of the first and second weighing conveyor groups may be placed such that the collecting conveyor apparatus is placed at the one end side of the weighing conveyors and a conveying direction of the weighing conveyors forms an angle which is less than 90 degrees, with respect to the conveying direction of the collecting conveyor apparatus.

In accordance with this configuration, since the weighing conveyor groups are placed at both sides of the collecting conveyor apparatus, the length of the collecting conveyor apparatus can be reduced, the discharge time of the objects can be reduced, and the combination weigher can be made compact. In addition, since the weighing conveyors are placed such that the conveying direction of the weighing conveyors forms an angle which is less than 90 degrees, with respect to the conveying direction of the collecting conveyor apparatus, the angle with which the directions of the objects discharged from the weighing conveyors are changed can be made smaller than 90 degrees. Therefore, the lengthwise directions of the objects discharged from the weighing conveyors can be easily changed into the direction conforming to the conveying direction of the collecting conveyor apparatus.

The combination weigher may further comprise a proper weight determiner unit for determining whether or not a weight of the objects held on each of the weighing conveyors falls within a proper weight range based on each of the measured weight values of the weight sensors; and wherein the weighing conveyor control means may be configured to, based on a result of the determination performed by the proper weight determiner unit, activate the weighing conveyor holding the objects having a weight which does not fall within the proper weight range to cause the weighing conveyor to convey the objects in a direction opposite to the first direction, to discharge the objects from the other end of the weighing conveyor.

In accordance with this configuration, the weighing conveyor is caused to convey the objects in the opposite direction (convey the objects in the direction opposite to the first direction) and to discharge the objects having a weight which does not fall within the proper weight range from the other end of the weighing conveyor. Therefore, in a case where the objects are fed to the weighing conveyors in such a way that one object is fed to each of the weighing conveyors, a combination including only the objects of an equal weight can be discharged. Also, in a case where the objects are fed to the weighing conveyors in such a way that a plurality of objects are fed to each of the weighing conveyors, by setting the proper weight range so that a weight range corresponding to the number of selection in a combination which provides a high combination weighing accuracy (planned number of weighing conveyors selected to make up a discharge combination) is attained, it becomes possible to easily form a combination of a weight which falls within the target weight range and lessen a frequency with which a combination failure occurs, in which no discharge combination exists.

In accordance with these inventions, since the weighing conveyors for conveying the objects are used in weighing units which weigh the objects, and the collecting conveyor apparatus collects the objects discharged from the conveying ends (one ends) of the weighing conveyors and discharges the objects, a height (level) difference between the weighing conveyors and the collecting conveyor apparatus can be reduced, which makes it possible to lessen an impact generated when the objects discharged from the weighing conveyors selected to make up the discharge combination are transferred onto the collecting conveyor apparatus. Because of this, it becomes possible to weigh the objects which are easily broken or damaged due to an impact, etc., generated when the objects are dropped, without causing damages to them.

Advantageous Effects of Invention

The present invention has the above stated configuration, and achieves advantages that it is possible to provide a combination weigher which is capable of discharging objects which are easily broken or damaged, due to an impact or the like generated when they are dropped, without causing damages to the objects, and in a state in which their lengthwise directions conform to each other.

The above and further objects, features and advantages of the present invention will more fully be apparent from the following detailed description of preferred embodiments with accompanying drawings.

DESCRIPTION OF EMBODIMENTS

Hereinafter, a preferred embodiment of the present invention will be described with reference to the drawings. Throughout the drawings, the same or corresponding components are designated by the same reference symbols, and will not be described in repetition. The present invention is not limited to the embodiment described below.

Embodiment

Figure 1A:
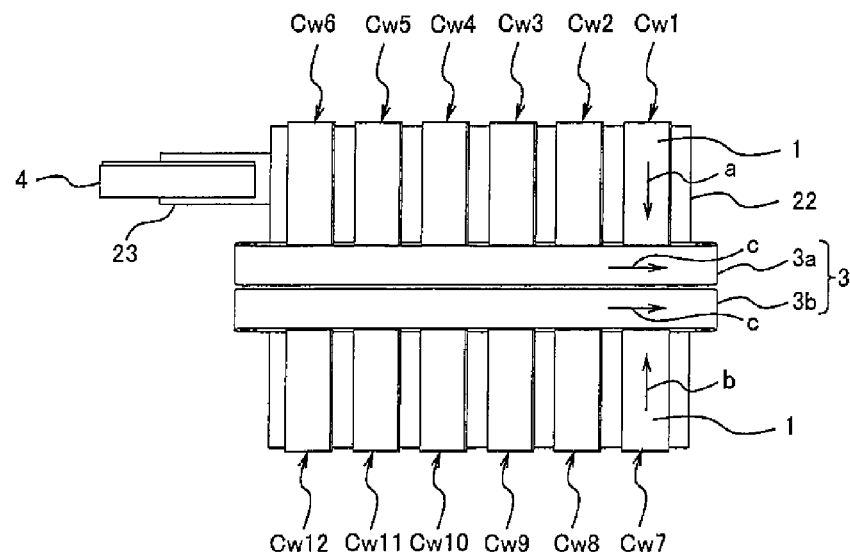
FIG. 1A is a plan view showing an exemplary configuration of a combination weigher according to an embodiment of the present invention, when viewed from above.
Figure 1B:
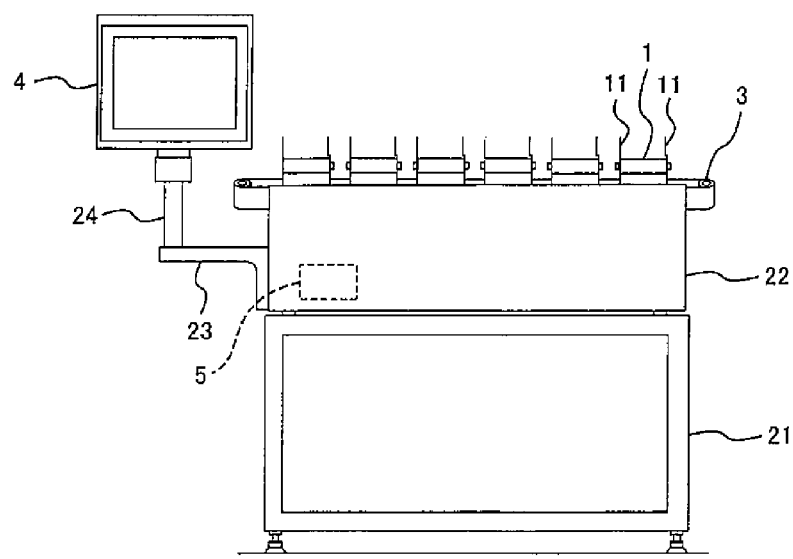
FIG. 1B is a front view of the combination weigher.
Figure 1C:
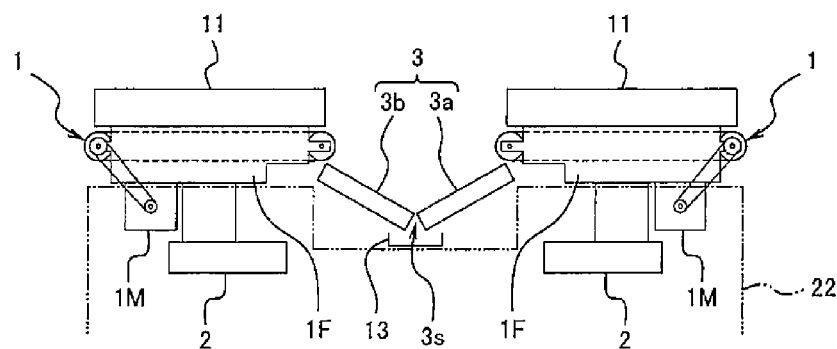
FIG. 1C is a schematic view showing a detailed configuration of a weighing unit and a collecting conveyor apparatus in the combination weigher.
Figure 2:
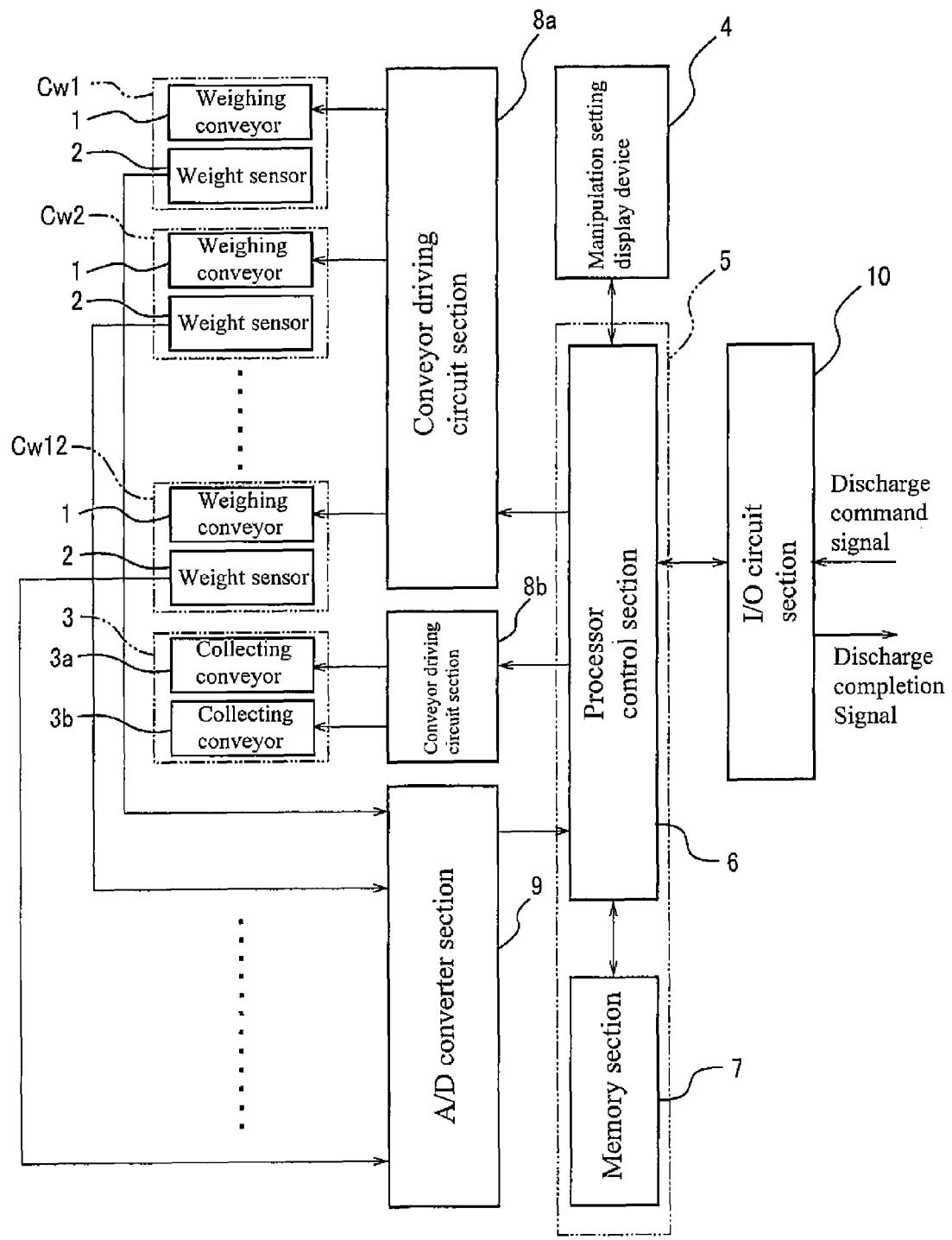
FIG. 2 is a block diagram showing a schematic configuration of the combination weigher having the exemplary configuration according to the embodiment of the present invention.

FIG. 1 is a schematic view showing an external appearance of an exemplary configuration of a combination weigher according to an embodiment of the present invention, in which FIG. 1A is a plan view of the combination weigher when viewed from above, FIG. 1B is a front view of the combination weigher, and FIG. 1C is a schematic view showing a detailed configuration of a weighing unit and a collecting conveyor in the combination weigher. FIG. 2 is a block diagram showing a schematic configuration of the combination weigher having the exemplary configuration according to the embodiment of the present invention.

This combination weigher includes a plurality of weighing units Cw1 to Cw12, a collecting conveyor apparatus 3, a manipulation setting display device 4, a controller 5, etc.

Each of the plurality of weighing units Cw1 to Cw12 includes a weighing conveyor 1 constituted by a belt conveyor, and a weight sensor 2 constituted by a load cell, or the like, supporting the weighing conveyor 1, to measure a weight of the objects put on the weighing conveyor 1. Each of the weighing conveyors 1 is provided with a pair of guide plates 11 for preventing the objects from being dropped out of both sides of the weighing conveyor 1. Specifically, for example, as shown in FIG. 1C, the guide plate 11 is mounted to a conveyor frame 1F. A driving motor 1M of the weighing conveyor 1 is attached to a lower surface of the conveyor frame 1F of each of the weighing conveyors 1. The weight sensor 2 is fastened to a fastening member (not shown) inside of an apparatus body 22, and the conveyor frame 1F is attached to an upper portion thereof via a mounting member. That is, the weight sensor 2 supports the weighing conveyor 1 including the pair of guide plates 11 and the driving motor 1M. Although in the present embodiment, the weighing conveyor 1 and the weight sensor 2 are distinguished from each other, a unit including the weighing conveyor 1 and the weight sensor 2 will be referred to as the weighing conveyor, in some cases.

A collecting conveyor apparatus 3 including two collecting conveyors 3a and 3b is placed between six weighing units Cw1 to Cw6 and six weighing units Cw7 to Cw12. The six weighing conveyors 1 of the weighing units Cw1 to Cw6 are arranged in parallel with each other at one side of the collecting conveyor apparatus 3. The weighing conveyors 1 of the weighing units Cw1 to Cw6 are placed such that a conveying direction (direction of arrow a) of the weighing conveyors 1 is perpendicular to a conveying direction (direction of arrow c) of the collecting conveyor apparatus 3. The six weighing conveyors 1 of the weighing units Cw7 to Cw12 are arranged in parallel with each other at the other side of the collecting conveyor apparatus 3. The weighing conveyors 1 of the weighing units Cw7 to Cw12 are placed such that a conveying direction (direction of arrow b) of the weighing conveyors 1 is perpendicular to the conveying direction (direction of arrow c) of the collecting conveyor apparatus 3.

As shown in FIG. 1C, the collecting conveyor apparatus 3 includes the two collecting conveyors 3a and 3b which are constituted by belt conveyors having endless flat belts and are arranged in parallel with each other such that conveying surfaces of the collecting conveyors 3a and 3b have a V-shaped cross-section (substantially-V shape). The collecting conveyors 3a and 3b are one kind of conveying conveyors. In the present embodiment, the collecting conveyors 3a and 3b collect the objects discharged from the plurality of weighing conveyors 1 and convey the objects. Therefore, they are referred to as the collecting conveyors. In the two collecting conveyors 3a and 3b, their conveying speeds are set equal and their conveying directions are indicated by the arrow c. The two collecting conveyors 3a and 3b are disposed to be apart from each other with a gap (predetermined gap) 3s between them. Below the gap 3s, a tray 13 is placed to receive trash or the like dropped through the gap 3s and accumulate the trash or the like therein. By drawing the tray 13, the accumulated trash or the like can be discarded (damped). A dimension h (see FIG. 4A) of the gap 3s between the two collecting conveyors 3a and 3b is, for example, about several mm, and set to a small value so that the objects are not dropped through the gap 3s and do not get stuck in the gap 3s. An angle θ (see FIG. 4B) formed between the conveying surfaces of the two collecting conveyors 3a and 3b is, for example, about 120 degrees. Alternatively, this angle θ may be configured to be adjustable.

Figure 4A:
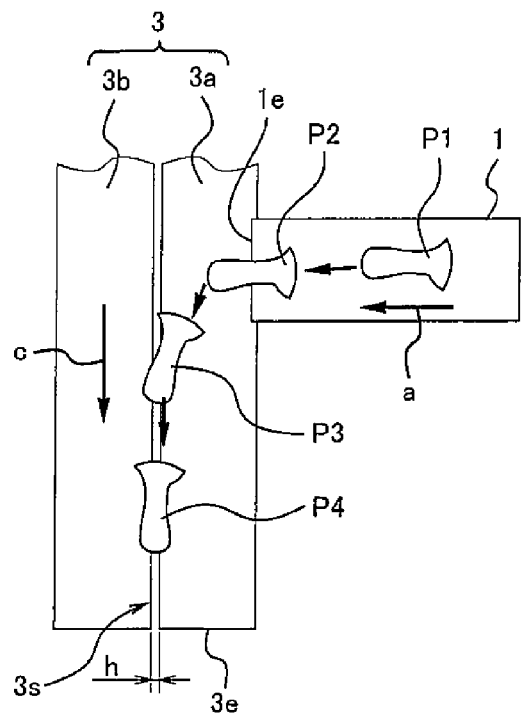
FIG. 4A is a schematic view showing a moving state in a case where an object is transferred from a particular weighing conveyor onto the collecting conveyor apparatus.

In the present embodiment, the collecting conveyor apparatus 3 conveys the objects in the direction as indicated by the arrow c and discharges the objects from a conveying end 3e thereof (see FIG. 4A). In this case, a subsequent-stage apparatus (not shown) is installed subsequently to the collecting conveyor apparatus 3 in the direction of the arrow c (right side in FIG. 1B), and the objects conveyed by the collecting conveyor apparatus 3 are discharged from the conveying end 3e thereof and fed to the subsequent-stage apparatus.

The apparatus body 22 is mounted onto a platform 21. The collecting conveyor apparatus 3 is mounted onto the apparatus body 22. Mounting support members and driving motors of the collecting conveyors 3a and 3b are not shown. A support member 23 is mounted to a side portion of the apparatus body 22. The manipulation setting display device 4 is attached to the support member 23 via a support column 24.

The apparatus body 22 accommodates conveyor driving circuit sections 8a and 8b, an A/D converter section 9, a control section 5, an I/O circuit section 10, etc., which are shown in FIG. 2.

Each of the weighing conveyors 1 is supported by the weight sensor 2 such as the load cell. The weight sensor 2 measures the weight of the objects on the weighing conveyor 1. The A/D converter section 9 converts a weight value (analog weight signal) measured by the weight sensor 2 into a digital signal, which is sent to the control section 5.

The control section 5 is constituted by, for example, a microcontroller, etc. The control section 5 includes a processor control section 6 including a CPU or the like, and a memory section 7 including a RAM, a ROM, etc. Running programs, data of operation parameters, measured weight data, etc., are stored in the memory section 7. A combination unit, a weighing conveyor control unit, a collecting conveyor control unit, a weight abnormality determiner unit, and a proper weight determiner unit are configured by the control section 5. The control section 5 may be constituted by a single controller for executing centralized control, or by a plurality of controllers cooperating with each other to execute decentralized control.

In the control section 5, the processor control section 6 executes the running programs stored in the memory section 7 to control the overall combination weigher, and performs a combination process, etc., as will be described later. For example, the control section 5 continuously obtains the weight value measured by the weight sensor 2 attached with the weighing conveyor 1 as a digital value via the A/D converter section 9, and stores the digital value in the memory section 7 as necessary. The control section 5 causes the conveyor driving circuit section 8a to control a driving operation of each of the weighing conveyors 1, and causes the conveyor driving circuit section 8b to control a driving operation of the collecting conveyors 3a and 3b. The control section 5 receives a discharge command signal from the subsequent-stage apparatus (not shown), and outputs a discharge completion signal to the subsequent-stage apparatus, via the I/O circuit section 10. The control section 5 receives a signal from the manipulation setting display device 4, and outputs a signal such as data to be displayed, to the manipulation setting display device 4.

The combination process performed by the control section 5 will be described. In this combination process, the control section 5 performs combination calculation based on the weights of the objects on the weighing conveyors 1 which are obtained from the measured weight values of the weight sensors 2, finds all combinations in which total weights (combination weights) of the objects held on the weighing conveyors 1 fall within a target weight range (allowable range with respect to a combination target weight), and determines one combination as a discharge combination. If there exist plural combinations in which total weights fall within the target weight range, the control section 5 determines a combination in which an absolute value of a difference between its combination weight and the combination target weight is smallest, as the discharge combination. The objects on the weighing conveyors 1 selected to make up the discharge combination are conveyed by these weighing conveyors 1, and are discharged onto the collecting conveyor apparatus 3.

The manipulation setting display device 4 includes, for example, a touch-screen type display (display device). The operator can perform manipulation of starting and stopping of running of the combination weigher, setting of the running parameters of the combination weigher, etc., on a screen of this display. In addition, the manipulation setting display device 4 is able to display a result (combination weight, etc.) of the combination process performed by the control section 5, on the screen of the display.

Figure 3:
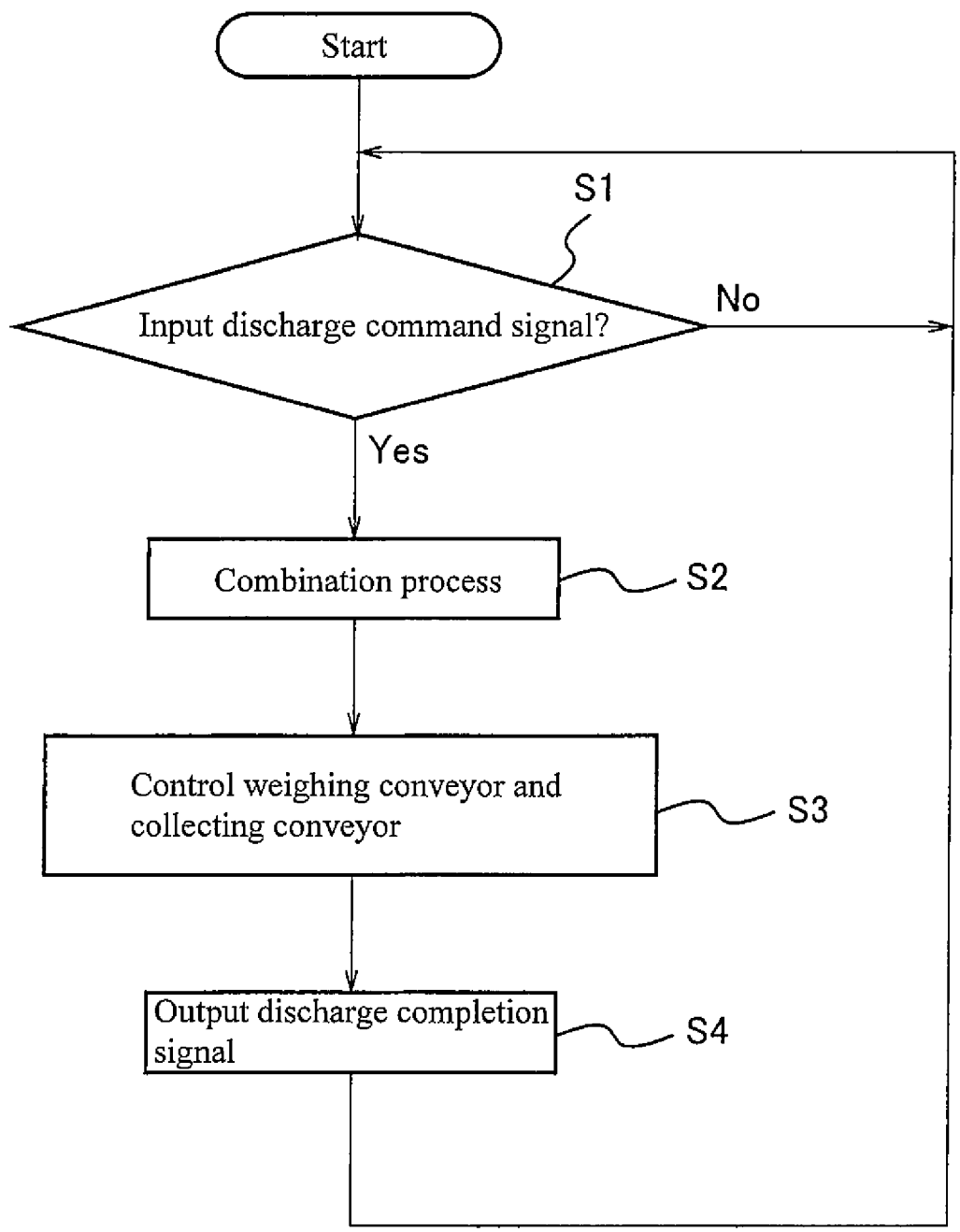
FIG. 3 is a flow chart showing an exemplary operation of the combination weigher having the exemplary configuration according to the embodiment of the present invention.

An operation of the combination weigher of the present embodiment configured as described above will be described. FIG. 3 is a flow chart showing an exemplary operation of the combination weigher having the exemplary configuration according to the embodiment. The operation of the combination weigher is implemented by the process executed by the control section 5. Information required to control the operation of the combination weigher, etc., are all stored in the memory section 7. The objects are, for example, an agricultural product. For example, the objects have a bar shape or an elongate shape, for example, asparagus or eryngii mushroom.

For example, the operator feeds (puts) the objects onto the weighing conveyors 1 in such a way that one object is fed to each of the weighing conveyors 1 as needed, on which there are no objects, in a deactivated state of the weighing conveyor 1 in which the objects are not conveyed. In this case, the objects are fed to the weighing conveyors 1 such that their lengthwise directions conform to the conveying direction (direction of arrow a) of the weighing conveyors 1 (including a case where their lengthwise directions substantially conform to the conveying direction of the weighing conveyors 1) (e.g., see FIG. 4A). Although not shown, the control section 5 obtains the measured weight values of the weight sensors 2 at specified time intervals from the A/D converter section 9, and knows the weighing conveyors 1 holding the objects and the weight values of the objects held on the weighing conveyors 1 based on the measured weight values of the weight sensors 2. When the control section 5 knows the weighing conveyors 1 holding the objects, the control section 5 compares each of the measured weight values to a preset loading detected reference value (e.g., 6g), it determines that the corresponding weighing conveyor 1 holds the object when the weight value is equal to or greater than the loading detected reference value, while it determines that the corresponding weighing conveyor 1 is not holding the object when the weight value is less than the loading detected reference value. In the control section 5, the loading detected reference value is set and stored in the memory section 7.

When the control section 5 receives a discharge command signal from the subsequent-stage apparatus in step S1, the process goes to step S2. In step S2, the control section 5 performs the above stated combination process, to find a discharge combination. Then, in step S3, the control section 5 activates the weighing conveyors 1 selected to make up the discharge combination, for first predetermined time to feed the objects from the weighing conveyors 1 to the collecting conveyor apparatus 3, and activates the collecting conveyor apparatus 3 for second predetermined time to convey the objects fed from the weighing conveyors 1, to the subsequent-stage apparatus. Then, the control section 5 outputs a discharge completion signal to the subsequent-stage apparatus at a predetermined timing (step S4). The above stated operation is repeated.

In the above operation, for example, activation (conveying operation) of the weighing conveyors 1 selected to make up the discharge combination, and activation (conveying operation) of the collecting conveyor apparatus 3, are started at the same time, and the objects discharged from the conveying ends 1e (see FIG. 4) of the weighing conveyors 1 are fed to the collecting conveyor apparatus 3 in an activated state in which the objects are conveyed. A conveying speed (V1) of the weighing conveyors 1 and a conveying speed (V2) of the collecting conveyor apparatus 3 (collecting conveyors 3a and 3b) are preset such that the conveying speed (V2) is higher than the conveying speed (V1).

Figure 4B:
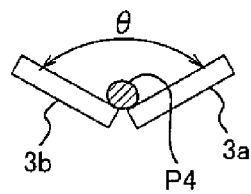
FIG. 4B is a cross-sectional view showing a state in which the object has been completely transferred onto the collecting conveyor apparatus and is transported by the collecting conveyor apparatus.

FIG. 4A is a schematic view showing a moving state in a case where the object is transferred from a particular weighing conveyor 1 onto the collecting conveyor apparatus 3. FIG. 4B is a cross-sectional view showing a state in which the object has been completely transferred onto the collecting conveyor apparatus 3 and is transported by the collecting conveyor apparatus 3 (state of position P4 in FIG. 4A).

In this case, the object moves in the order of position P1, position P2, position P3 and position P4. The object is in the position P1 on the weighing conveyor 1 in a deactivated state. Then, the weighing conveyor 1 is activated and the object is transported by the weighing conveyor 1 in the direction of the arrow a. When the object comes to the position P2, a head portion of the object (tip end portion in a transporting direction) contacts the collecting conveyor 3a. Thereupon, a rear portion of the object is transported by the weighing conveyor 1 in the direction of the arrow a, while the tip end portion thereof is moved by the collecting conveyor apparatus 3 in the transporting direction (direction of the arrow c) of the collecting conveyor apparatus 3. Then, the object goes through a state in the position P3, and then lies down in a bottom portion of the V-shaped cross-section in the two collecting conveyors 3a and 3b (state in the position P4). In this state, i.e., in a state in which a lengthwise direction of the object conforms to the transporting direction (direction of the arrow c), the object is transported by collecting conveyor apparatus 3 and discharged from the conveying end 3e of the collecting conveyor apparatus 3 to the subsequent-stage apparatus.

Figure 4C:
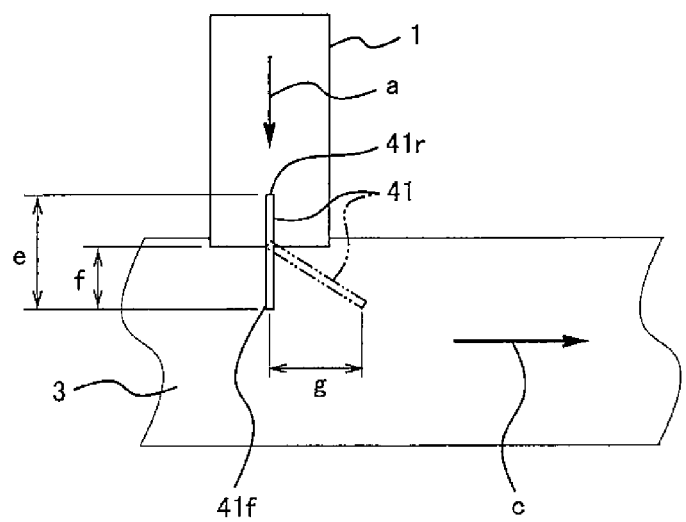
FIG. 4C is a view for explaining a conveying speed of the weighing conveyor and a conveying speed the collecting conveyor apparatus in the case where the object is transferred from the weighing conveyor onto the collecting conveyor apparatus.

Now, a description will be given of the reason why the conveying speed V2 of the collecting conveyor apparatus 3 (collecting conveyors 3a and 3b) is set higher than the conveying speed V1 of the weighing conveyors 1. FIG. 4C is a view for explaining the conveying speed of the weighing conveyor 1 and the conveying speed of the collecting conveyor apparatus 3 in the case where the object is transferred from the weighing conveyor 1 onto the collecting conveyor apparatus 3.

Referring to FIG. 4C, it is supposed that, when a tip end (head portion) 41f of an object 41 schematically shown by a solid line protrudes by a length f from the conveying end of the weighing conveyor 1, it contacts the conveying surface of the collecting conveyor apparatus 3, and then is moved by the collecting conveyor apparatus 3 in the direction of the arrow c. The length e will be expressed below as L in the following formulas. Hereinafter, the conveying speeds V1 and V2 will be speeds per second.

Here, it is also supposed that, when t seconds lapses, the object 41 is changed from the state indicated by the solid line to a state (state indicated by a dot-dash line) which is immediately before a rear end 41r of the object 41 is dropped from the weighing conveyor 1. A distance over which the rear end 41r of the object 41 is transported by the weighing conveyor 1 in the direction of the arrow a for t seconds is V1×t.

The protruding length f of the object 41 at a time point when the tip end 41f of the object 41 contacts the collecting conveyor apparatus 3 is expressed as:

$$f = k \times L = kL (0 < k < 1)$$

The distance (V1×t) over which the object 41 is transported by the weighing conveyor 1 for t seconds is derived by subtracting the protruding length f from the length e (=L) of the object 41 and is expressed as the following formula (1):

$$V1t = L - kL = L(1-k) \quad (1)$$

Also, a distance g over which the tip end 41f of the object 41 is moved in the direction of the arrow c for t seconds is as follows (hereinafter, for example, √x is represented to indicate a positive square root of x):

$$g = \sqrt{(e^2 - f^2)} = \sqrt{(L^2 - k^2 L^2)} = L\sqrt{(1-k^2)}$$

When the distance g over which the tip end 41f of the object 41 is moved in the direction of the arrow c is considered as the distance (V2×t) over which the tip end 41f is transported by the collecting conveyor apparatus 3, in the direction of the arrow c for t seconds, the following formula (2) is derived:

$$V2 \times t = L\sqrt{(1-k^2)} \quad (2)$$

V2/V1 is calculated using the above formula (1) and the above formula (2) as follows:

$$\begin{aligned} V2/V1 &= V2 \times t / V1 \times t \\ &= L\sqrt{(1-k^2)} / L(1-k) \\ &= \sqrt{(1+k)} / \sqrt{(1-k)} \end{aligned}$$

Since $0 < k < 1$, $V2/V1 > 1$, and $V2 > V1$.

In the above description, only the states, which are the state in which the object 41 is indicated by the solid line of FIG. 4C and the state in which the object 41 is indicated by the dot-dash line of FIG. 4C, are considered, but an intermediate state in which the object 41 is transported, which state is between the state of the solid line and the state of the dot-dash line, etc., is not considered. However, it is obvious that by setting at least V2>V1, the direction (lengthwise direction) of the object 41 can be changed easily from the conveying direction (direction of the arrow a) of the weighing conveyor 1, into the conveying direction (direction of the arrow c) of the collecting conveyor apparatus 3.

Meanwhile, the subsequent-stage apparatus is configured to output a discharge command signal to the combination weigher at a specified timing and start a predetermined operation when the subsequent-stage apparatus receives a discharge completion signal from the combination weigher. As the subsequent-stage apparatus, there is a case where an apparatus (intermittent conveying apparatus) in which a plurality of trays (shallow boxes) are annularly joined to each other and are horizontally moved in an intermittent manner, is installed. In this case, the objects discharged from the collecting conveyor apparatus 3 are fed to each of the trays of the intermediate conveying apparatus. Then, the objects fed to each of the trays are filled into one pack by an apparatus in a subsequent stage of the intermittent conveying apparatus or by an operator. In this case, for example, when the intermittent conveying apparatus moves the trays to move an empty tray to a discharge port of the collecting conveyor apparatus 3, it outputs a discharge command signal to the combination weigher. And, when a specified time passes after the intermittent conveying apparatus receives a discharge completion signal from the combination weigher, the intermittent conveying apparatus moves the trays to move a next empty tray to the discharge port of the collecting conveyor apparatus 3. Or, as the subsequent-stage apparatus, for example, there is a case where a packaging machine of a bag filling type for filling the objects into bags is installed.

Although all of the weighing conveyors 1 selected to make up the discharge combination are activated at the same time to discharge the objects to the collecting conveyor apparatus 3 in the above described example, the present invention is not limited to this. For example, activation start timings of the respective weighing conveyors 1 selected to make up the discharge combination may be decided as needed so that the objects discharged from the respective weighing conveyors 1 overlap with each other on the collecting conveyor apparatus 3.

In the present embodiment, the objects of a bar shape or an elongate shape are fed to the weighing conveyors 1 in such a way that, for example, one object is fed to each of the weighing conveyors 1 such that the lengthwise direction of the object conforms to the conveying direction of the weighing conveyor 1 (including a case where the lengthwise direction of the object substantially conforms to the conveying direction of the weighing conveyor 1), and the conveying speed V2 of the collecting conveyor apparatus 3 is set higher than the conveying speed V1 of the weighing conveyors 1. This makes it possible to smoothly change the lengthwise direction of the object discharged from the weighing conveyor 1 into the direction conforming to the conveying direction of the collecting conveyor apparatus 3. Because of this, the objects can be discharged from the conveying end of the collecting conveyor apparatus 3 to the subsequent-stage apparatus in a state in which the lengthwise directions of the objects discharged from the respective weighing conveyors 1 conform to the conveying direction of the collecting conveyor apparatus 3. In addition, since the two collecting conveyors 3a and 3b placed to have the V-shaped cross-section are used as the collecting conveyor apparatus 3, the objects lie down in the bottom portion of the V-shaped cross-section in the two collecting conveyors 3a and 3b. As a result, it becomes possible to surely attain a situation in which the objects are discharged from the collecting conveyor apparatus 3 in a state in which the lengthwise directions of the objects discharged from the respective weighing conveyors 1 conform to the conveying direction of the collecting conveyor apparatus 3.

Since in the present embodiment, the weighing conveyors 1 are used in the plurality of weighing units Cw1 to Cw12 for weighing the objects, and the objects discharged from one ends (e.g., conveying ends 1e of FIG. 4A) of the weighing conveyors 1 are collected on the collecting conveyor apparatus 3 and discharged to the subsequent-stage apparatus, a height (level) difference between the weighing conveyors 1 and the collecting conveyor apparatus 3 can be reduced, and thus an impact generated when the objects discharged from the weighing conveyors 1 selected to make up the discharge combination are transferred onto the collecting conveyor apparatus 3 can be lessened. Because of this, the objects which are easily broken or damaged, due to an impact or the like generated when they are dropped, can be weighed without causing damages to them.

Figure 5:
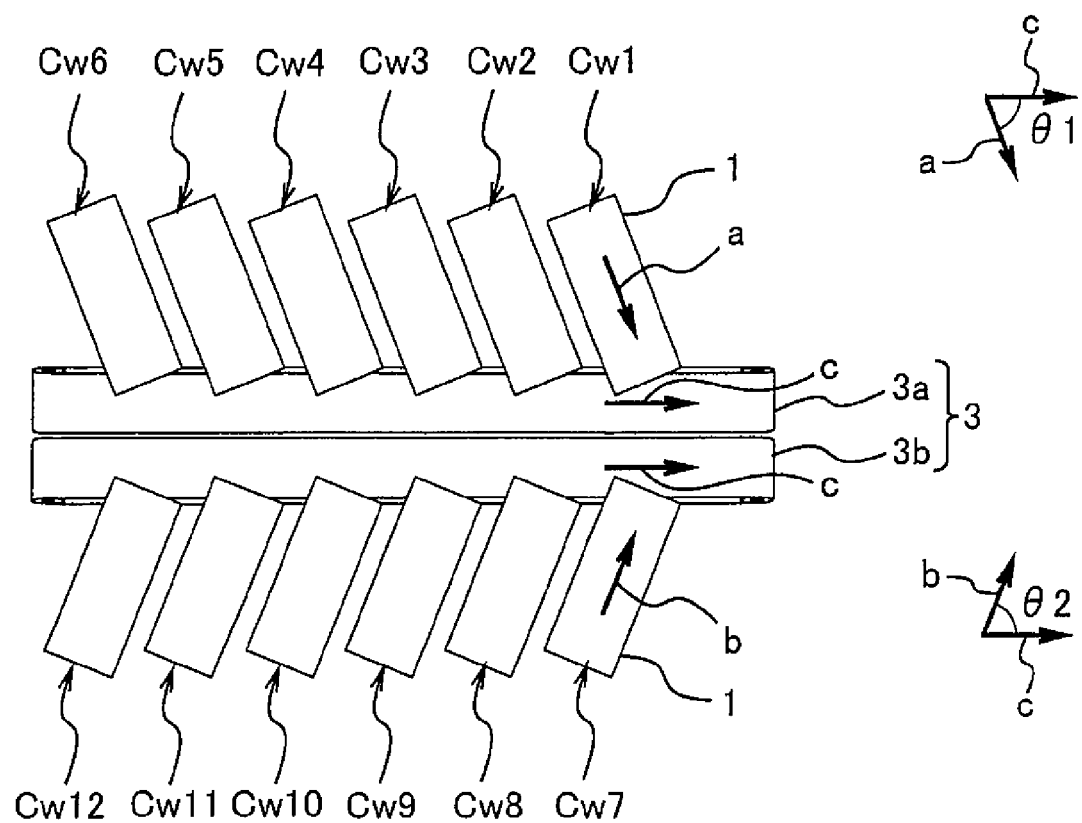
FIG. 5 is a schematic plan view of another exemplary configuration of the combination weigher according to the embodiment of the present invention, when viewed from above.

Although in the present embodiment, the weighing conveyors 1 and the collecting conveyor apparatus 3 are placed such that the conveying direction of the weighing conveyors 1 is perpendicular to the conveying direction of the collecting conveyor apparatus 3, they may be placed such that angles θ1 and θ2 which are formed between the conveying directions (directions of arrows a, b) of the weighing conveyors 1 and the conveying direction (direction of arrow c) of the collecting conveyor apparatus 3 are less than 90 degrees, as shown in FIG. 5. FIG. 5 is a schematic plan view of a combination weigher having another exemplary configuration according to the present embodiment, when viewed from above. In this configuration, since the angle with which the directions of the objects discharged from the weighing conveyors 1 are changed can be made smaller than 90 degrees, the lengthwise directions of the objects discharged from the weighing conveyors 1 can be easily changed into the direction conforming to the conveying direction of the collecting conveyor apparatus 3.

Figure 6A:
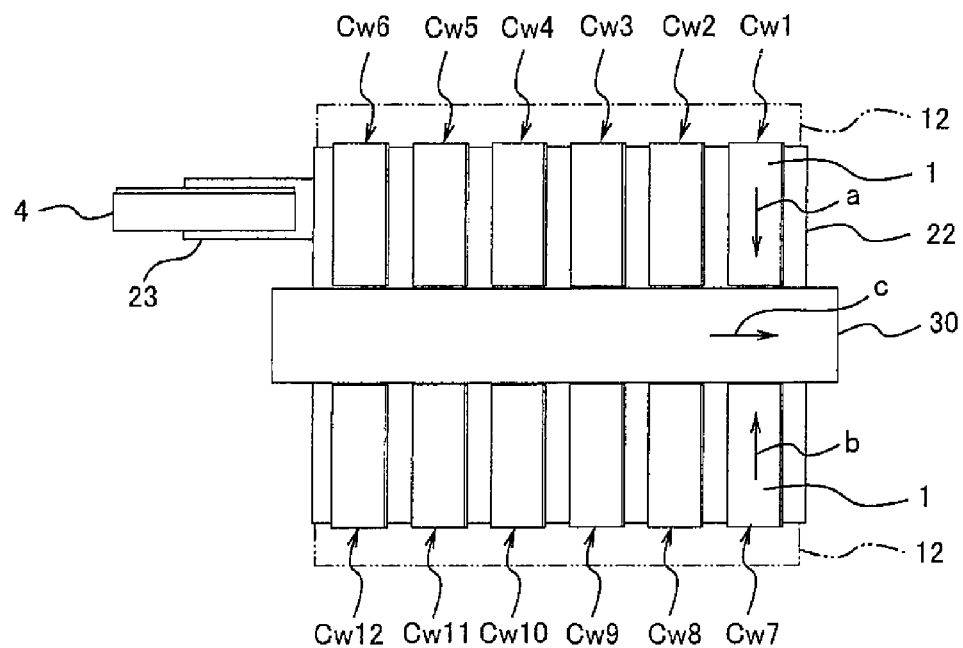
FIG. 6A is a plan view of a combination weigher according to a modified example of the embodiment of the present invention, when viewed from above.
Figure 6B:
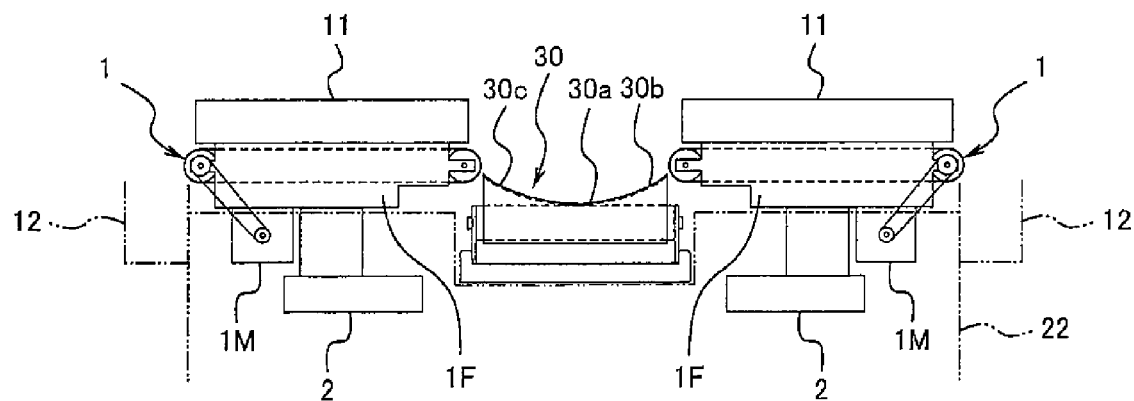
FIG. 6B is a schematic view showing a detailed configuration of a weighing unit and a collecting conveyor apparatus in the combination weigher.

Although in the present embodiment, the two colleting conveyors 3a and 3b are used as the collecting conveyor apparatus 3, the collecting conveyor apparatus 3 may be composed of a single belt conveyor. An exemplary configuration in this case is shown in FIG. 6. FIG. 6A is a plan view of a combination weigher according to a modified example of the embodiment of the present invention when viewed from above, and FIG. 6B is a schematic view showing a detailed configuration of a weighing unit and a collecting conveyor apparatus in the combination weigher. In FIGS. 6A and 6B, the corresponding components in FIGS. 1A to 1C are identified by the same reference symbols.

In this modified example, the collecting conveyor apparatus is constituted by a single collecting conveyor 30 composed of a belt conveyor. This collecting conveyor 30 is one kind of conveying conveyor. As shown in FIG. 6B, the collecting conveyor 30 is a trough-type belt conveyor configured such that both edge portions (widthwise both end portions of the belt) 30a and 30b of an upper surface portion (conveying surface) of the ring-shaped belt rotating are held up by support members (not shown), and the objects are conveyed in a state in which a center portion 30c is concave relative to the both edge portions 30a and 30b of the upper surface portion. Even when the trough-type belt conveyor in which the center portion of the conveying surface is concave is used in this way, the objects can be discharged to the subsequent-stage apparatus in a state in which the lengthwise directions of the objects conform to the conveying direction of the collecting conveyor apparatus 3, by setting the conveying speed of the collecting conveyor 30 higher than the conveying speed of the weighing conveyors 1. In addition, since the objects discharged from the weighing conveyors 1 at both sides can be caused to gather in the substantially center portion of the collecting conveyor apparatus 3 and can be discharged to the subsequent-stage apparatus, feeding of the objects to the subsequent-stage apparatus can be performed accurately. For example, in the case where the subsequent-stage apparatus is the packaging machine, the objects can be filled into the bags such that the objects do not protrude to outside of the bags. Or, in the case where the subsequent-stage apparatus is the above stated intermittent conveying apparatus, the objects can be filled onto the trays such that the objects do not protrude to outside of the trays. Alternatively, the collecting conveyor apparatus 3 may be constituted by a belt conveyor having a flat conveying surface. In that case, guide plates such as the guide plates 11 of the weighing conveyor 1 may be provided at both edge portions of the belt as required. As described above, the collecting conveyor apparatus may be constituted by a single belt conveyor. The same applies to the configuration shown in FIG. 5.

Nonetheless, the collecting conveyor apparatus 3 having the V-shaped cross-section as described previously is more preferably used than the collecting conveyor apparatus composed of the single belt conveyor. This is because, the collecting conveyor apparatus 3 having the V-shaped cross-section allows the objects to lie down in the bottom portion of the V-shaped cross-section (state in the position P4 of FIGS. 4A and 4B), which makes it possible to surely attain a state in which the lengthwise directions of the objects conform to the conveying direction of the collecting conveyor apparatus 3 and also prevent the objects from rolling in a width direction (direction perpendicular to the conveying direction) of the collecting conveyor apparatus 3.

Depending on the kind of the objects, etc., without a need to set the conveying speed of the collecting conveyor apparatus 3 higher than the conveying speed of the weighing conveyors 1, the collecting conveyor apparatus 3 having the V-shaped cross-section can easily attain a situation in which the lengthwise directions of the objects conforms to the conveying direction of the collecting conveyor apparatus 3 and allows the objects discharged from the respective weighing conveyors 1 to be discharged in a state in which the lengthwise directions of the objects conform to the conveying direction of the collecting conveyor apparatus 3. This is because in the collecting conveyor apparatus 3, the objects discharged from the weighing conveyors 1 lie down in the bottom portion of the V-shaped cross section in the two collecting conveyors 3a and 3b.

Also, in the present embodiment, the collecting conveyor apparatus 3 may be configured to have a weighing function in order to check a total weight of the objects discharged from the weighing conveyors 1 to the collecting conveyor apparatus 3. For example, two weight sensors (e.g., load cells) supporting the two collecting conveyors 3a and 3b, respectively, or a weight sensor (e.g., load cell) supporting both of the two collecting conveyors 3a and 3b, is/are provided and configured to input measured weight value(s) to the control section 5. Then, the control section 5 determines whether or not the weight (weight measured by the weight sensor(s)) of the objects discharged from the weighing conveyors 1 selected to make up the discharge combination and are put on the collecting conveyor apparatus 3 falls within a target weight range. If the control section 5 determines that the weight of the objects does not fall within the target weight range (falls outside of the target weight range), the control section 5 outputs a weight abnormality signal to the subsequent-stage apparatus. In this case, the subsequent-stage apparatus is configured such that receiving the weight abnormality signal from the control section 5, it excludes the objects having the weight which falls outside of the target weight range, from a production line. With this configuration, it becomes possible to prevent a situation in which even when trash or the like adheres to the objects and is dropped through the gap 3s between the collecting conveyors 3a and 3b, and thereby the weight of the objects is reduced, the objects having the weight which falls outside of the target weight range are shipped.

In the present embodiment, the control section 5 may determine whether or not the weight of the objects put on each of the weighing conveyors 1 falls within a predetermined proper weight range, and may exclude the objects having a weight which falls outside of the proper weight range. In this case, an upper limit value and a lower limit value of the predetermined proper weight range are preset in the control section 5 and stored in the storage section 7 in the control section 5. When the operator puts the objects onto the weighing conveyors 1 in the deactivated state, the control section 5 determines whether or not the weight of the objects put on each of the weighing conveyors 1 which is obtained as the weight value of the corresponding weight sensor 2 falls within the proper weight range. If the control section 5 determines that the weight does not fall within the proper weight range, it activates the corresponding weighing conveyor 1 for a predetermined time to convey the objects, in a direction opposite to the normal conveying direction (directions of arrows a, b), to discharge the objects to, for example, recovery containers 12 (see FIG. 6). For example, as shown by the dash-dot line in FIG. 6, the recovery containers 12 are provided at an opposite side of the collecting conveyor apparatus 3 to receive the objects discharged from the weighing conveyors 1 of the weighing units Cw1 to Cw12, when the weighing conveyors 1 convey the objects in the opposite direction. In this case, the weighing conveyor 1 holding the objects having a weight which does not fall within the proper weight range does not participate in the combination calculation in the combination process and is not selected as the discharge combination, and the objects on that weighing conveyor 1 are discharged to the recovery container 12 as described above. Because of this, in a case where the objects are fed to the weighing conveyors 1 in such a way that one object is put on each of the weighing conveyors 1, a combination including only the objects of an equal weight can be discharged.

Instead of causing the weighing conveyor 1 to convey the objects in the opposite direction as described above, the operator may remove the objects having a weight which does not fall within the proper weight range. In this case, the weighing conveyor 1 holding the objects having a weight which does not fall within the proper weight range may be kept in a deactivated state, and a notification device may be provided to notify the operator of this weighing conveyor 1. For example, the notification device may be configured in such a manner that display lights are provided to respectively correspond to the weighing conveyors 1 with a one-to-one correspondence, and the control section 5 causes the display light corresponding to the weighing conveyor 1 holding the objects having a weight which does not fall within the proper weight range, to be lighted or brink. Or, another configuration may be used so long as the operator can be notified of the objects having a weight which does not fall within the proper weight range.

In the present embodiment, since the weighing conveyors 1 are placed at both sides of the collecting conveyor apparatus 3, the length of the collecting conveyor apparatus 3 can be reduced, and the discharge time of the objects can be reduced. In addition, the combination weigher can be made compact, and the operator can easily carry out the work for feeding the objects. Alternatively, the weighing conveyors 1 may be placed only at one side of the collecting conveyor apparatus 3. However, in that case, the length of the collecting conveyor apparatus 3 for placing a predetermine number of weighing conveyors 1 increases, and the discharge time of the objects discharged from the collecting conveyor apparatus 3 increases. Therefore, in order to reduce the weighing cycle, the weighing conveyors 1 are preferably placed at both sides of the collecting conveyor apparatus 3 as described above.

Although in the present embodiment, the combination weigher is configured to initiate the combination process upon reception of the discharge command signal from the subsequent-stage apparatus, the present invention is not limited to this. For example, the combination weigher may be configured to perform the combination process at preset specified time intervals, and to activate the weighing conveyors 1 selected to make up a discharge combination and the collecting conveyor apparatus 3 to discharge the objects to the subsequent-stage apparatus upon reception of the discharge command signal. Time required for the combination process is about 10 ms. Therefore, even when the combination process is initiated after reception of the discharge command signal, like the present embodiment, an actual weighing cycle is not substantially affected. Also, the combination weigher is preferably configured to initiate the combination process after reception of the discharge command signal like the present embodiment, because the number of weight values used in the combination calculation can be increased, and hence combination weighing accuracy can be improved.

The collecting conveyor apparatus 3 may be configured to be activated all the time. A motor for activating the conveyor does not consume electric power in a deactivated state, and unnecessary electric power is consumed to activate the motor. Therefore, it is desirable to activate the collecting conveyor apparatus 3 such that electric power consumption is less as a whole.

Although in the present embodiment, the driving motor 1M is mounted to the lower surface of the conveyor frame 1F of the weighing conveyor 1, and the weight sensor 2 supports the weighing conveyor 1 including the driving motor 1M, the weight sensor 2 may support the weighing conveyor 1 except for the driving motor 1M. In this case, the driving motor 1M is mounted to a member which is not supported on the weight sensor 2. For example, a coupling mechanism for coupling the driving motor 1M to a driving roller of the weighing conveyor 1 is configured in such a manner that the rotational power of the driving motor 1M is transmitted to the driving roller of the weighing conveyor 1 only when the weighing conveyor 1 is activated (objects are conveyed), and the driving motor 1M is physically separated from the driving roller of the weighing conveyor 1 when the weighing conveyor 1 is deactivated (objects are not conveyed), to prevent a load caused by the driving motor 1M from being exerted on the weight sensor 2. And, the weight sensor 2 measures the weight of the objects on the weighing conveyor 1 when the weighing conveyor 1 is deactivated. The above configuration may be used.

Although in the present embodiment, feeding of the objects to the weighing conveyors 1 is performed manually (by the operator), a feeding device may feed the objects to the weighing conveyors 1 automatically so long as the feeding device is able to feed the objects to the weighing conveyors 1 without causing damages to the objects.

Numeral modifications and alternative embodiments of the present invention will be apparent to those skilled in the art in view of the foregoing description. Accordingly, the description is to be construed as illustrative only, and is provided for the purpose of teaching those skilled in the art the best mode of conveying out the invention. The details of the structure and/or function may be varied substantially without departing from the spirit of the invention.

INDUSTRIAL APPLICABILITY

The present invention is useful as a combination weigher, etc., which can prevent damages to objects which are easily broken or damaged, due to an impact or the like, generated when they are dropped.

REFERENCE SIGNS LIST 1 weighing conveyor
2 weight sensor
3 collecting conveyor apparatus
3a, 3b, 30 collecting conveyor
4 manipulation setting display device
5 control section

The invention claimed is:

1. A combination weigher comprising:
a collecting conveyor apparatus which conveys in a direction objects fed to the collecting conveyor apparatus and discharges the objects;
a plurality of weighing conveyors arranged along a conveying direction of the collecting conveyor apparatus, the weighing conveyors being fed with the objects in a deactivated state in which the weighing conveyors do not convey the objects and being configured to convey the objects held thereon in a first direction and discharge the objects from one ends thereof, to feed the objects to the collecting conveyor apparatus in an activated state in which the collecting conveyor apparatus conveys the objects;
a plurality of weight sensors provided to correspond to the weighing conveyors, respectively, to measure weights of the objects held on the weighing conveyors;
a combination unit for finding a discharge combination including a combination of the weighing conveyors holding the objects in which a total weight thereof falls within a target weight range, based on the measured weight values of the weight sensors; and
a weighing conveyor control unit which activates the weighing conveyors selected to make up the discharge combination to convey the objects on the weighing conveyors in the first direction and discharge the objects from one ends of the weighing conveyors;
wherein a conveying speed of the collecting conveyor apparatus is set higher than a conveying speed of the weighing conveyors.

2. The combination weigher according to claim 1,
wherein the collecting conveyor apparatus includes two belt conveyors which have endless flat belts and are arranged in parallel with each other to have conveying surfaces of a V-shaped cross-section.

3. A combination weigher comprising:
a collecting conveyor apparatus including two belt conveyors which have endless flat belts and are arranged in parallel with each other to have conveying surfaces of a V-shaped cross-section, the collecting conveyor apparatus being configured to convey in a direction the objects fed to the collecting conveyor apparatus and discharge the objects;
a plurality of weighing conveyors arranged along a conveying direction of the collecting conveyor apparatus, the weighing conveyors being fed with the objects in a deactivated state in which the weighing conveyors do not convey the objects and being configured to convey the objects held thereon in a first direction and discharge the objects from conveying ends thereof, to feed the objects to the collecting conveyor apparatus in an activated state in which the collecting conveyor apparatus conveys the objects;
a plurality of weight sensors provided to correspond to the weighing conveyors, respectively, to measure weights of the objects held on the weighing conveyors;
a combination unit for finding a discharge combination including a combination of the weighing conveyors holding the objects in which a total weight thereof falls within a target weight range, based on the measured weight values of the weight sensors; and
a weighing conveyor control unit which activates the weighing conveyors selected to make up the discharge combination to convey the objects on the weighing conveyors in the first direction and discharge the objects from one ends of the weighing conveyors.

4. The combination weigher according to claim 2 or 3,
wherein the two belt conveyors are placed with a gap between the belt conveyors; and
the gap is set to a dimension that prevents the objects held on the two belt conveyors from being dropped through the gap and prevents the objects from getting stuck in the gap.

5. The combination weigher according to claim 4, further comprising:
a weighing unit for measuring a weight of the objects conveyed by the collecting conveyor apparatus; and
a weight abnormality determination unit for determining whether or not the weight of the objects which is measured by the weighing unit falls within the target weight range, when the objects are discharged from all of the weighing conveyors selected to make up the discharge combination to the collecting conveyor apparatus, the weight abnormality determination unit being configured to output a weight abnormality signal to an apparatus in a subsequent stage of the combination weigher, when the weight abnormality determination unit determines that the weight does not fall within the target weight range.

6. The combination weigher according to claim 1,
wherein the plurality of weighing conveyors constitute first and second weighing conveyor groups which are placed such that the collecting conveyor apparatus is interposed between the first and second weighing conveyor groups;
wherein the weighing conveyors in each of the first and second weighing conveyor groups are arranged in parallel with each other; and
wherein the weighing conveyors in each of the first and second weighing conveyor groups are placed such that the collecting conveyor apparatus is placed at the one end side of the weighing conveyors and a conveying direction of the weighing conveyors is perpendicular to the conveying direction of the collecting conveyor apparatus.

7. The combination weigher according to claim 1,
wherein the plurality of weighing conveyors constitute first and second weighing conveyor groups which are placed such that the collecting conveyor apparatus is interposed between the first and second weighing conveyor groups;
wherein the weighing conveyors in each of the first and second weighing conveyor groups are arranged in parallel with each other; and
wherein the weighing conveyors in each of the first and second weighing conveyor groups are placed such that the collecting conveyor apparatus is placed at the one end side of the weighing conveyors and a conveying direction of the weighing conveyors forms an angle which is less than 90 degrees, with respect to the conveying direction of the collecting conveyor apparatus.

8. The combination weigher according to claim 1, further comprising:
   a proper weight determiner unit for determining whether or not a weight of the objects held on each of the weighing conveyors falls within a proper weight range based on each of the measured weight values of the weight sensors; and
   wherein the weighing conveyor control means is configured to, based on a result of the determination performed by the proper weight determiner unit, activate the weighing conveyor holding the objects having a weight which does not fall within the proper weight range to cause the weighing conveyor to convey the objects in a direction opposite to the first direction, to discharge the objects from the other end of the weighing conveyor.

9. The combination weigher according to claim 3,
   wherein the two belt conveyors are placed with a gap between the belt conveyors; and
   the gap is set to a dimension that prevents the objects held on the two belt conveyors from being dropped through the gap and prevents the objects from getting stuck in the gap.

10. The combination weigher according to claim 9, further comprising:
    a weighing unit for measuring a weight of the objects conveyed by the collecting conveyor apparatus; and
    a weight abnormality determination unit for determining whether or not the weight of the objects which is measured by the weighing unit falls within the target weight range, when the objects are discharged from all of the weighing conveyors selected to make up the discharge combination to the collecting conveyor apparatus, the weight abnormality determination unit being configured to output a weight abnormality signal to an apparatus in a subsequent stage of the combination weigher, when the weight abnormality determination unit determines that the weight does not fall within the target weight range.

11. The combination weigher according to claim 3,
    wherein the plurality of weighing conveyors constitute first and second weighing conveyor groups which are placed such that the collecting conveyor apparatus is interposed between the first and second weighing conveyor groups;
    wherein the weighing conveyors in each of the first and second weighing conveyor groups are arranged in parallel with each other; and
    wherein the weighing conveyors in each of the first and second weighing conveyor groups are placed such that the collecting conveyor apparatus is placed at the one end side of the weighing conveyors and a conveying direction of the weighing conveyors is perpendicular to the conveying direction of the collecting conveyor apparatus.

12. The combination weigher according to claim 3,
    wherein the plurality of weighing conveyors constitute first and second weighing conveyor groups which are placed such that the collecting conveyor apparatus is interposed between the first and second weighing conveyor groups;
    wherein the weighing conveyors in each of the first and second weighing conveyor groups are arranged in parallel with each other; and
    wherein the weighing conveyors in each of the first and second weighing conveyor groups are placed such that the collecting conveyor apparatus is placed at the one end side of the weighing conveyors and a conveying direction of the weighing conveyors forms an angle which is less than 90 degrees, with respect to the conveying direction of the collecting conveyor apparatus.

13. The combination weigher according to claim 3, further comprising:
    a proper weight determiner unit for determining whether or not a weight of the objects held on each of the weighing conveyors falls within a proper weight range based on each of the measured weight values of the weight sensors; and
    wherein the weighing conveyor control means is configured to, based on a result of the determination performed by the proper weight determiner unit, activate the weighing conveyor holding the objects having a weight which does not fall within the proper weight range to cause the weighing conveyor to convey the objects in a direction opposite to the first direction, to discharge the objects from the other end of the weighing conveyor.

* * * * *